US011305584B2

(12) United States Patent
Domingo et al.

(10) Patent No.: US 11,305,584 B2
(45) Date of Patent: Apr. 19, 2022

(54) TIRE CROWN FOR A HEAVY DUTY CIVIL ENGINEERING VEHICLE

(71) Applicant: COMPAGNIE GENERALE DES ETABLISSEMENTS MICHELIN, Clermont-Ferrand (FR)

(72) Inventors: Alain Domingo, Clermont-Ferrand (FR); Olivier Spinnler, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/462,857

(22) PCT Filed: Nov. 17, 2017

(86) PCT No.: PCT/FR2017/053145
§ 371 (c)(1),
(2) Date: May 21, 2019

(87) PCT Pub. No.: WO2018/091837
PCT Pub. Date: May 24, 2018

(65) Prior Publication Data
US 2020/0079154 A1    Mar. 12, 2020

(30) Foreign Application Priority Data
Nov. 21, 2016 (FR) ..................... 1661293

(51) Int. Cl.
*B60C 9/20* (2006.01)
*B60C 11/04* (2006.01)
(Continued)

(52) U.S. Cl.
CPC .......... *B60C 9/2006* (2013.01); *B60C 11/042* (2013.01); *B60C 11/1259* (2013.01);
(Continued)

(58) Field of Classification Search
CPC ................ B60C 9/28; B60C 2009/209; B60C 2200/065
See application file for complete search history.

(56) References Cited

U.S. PATENT DOCUMENTS 5,843,583 A  12/1998 D'Haene et al.
2008/0110545 A1 *  5/2008 Kobayashi ................ B60C 9/28
                                            152/527

(Continued)

FOREIGN PATENT DOCUMENTS

ER  3 033 287         9/2016
FR  2990963 A1 *  11/2013 ............... B60C 9/18
(Continued)

*Primary Examiner* — Timothy Kennedy
*Assistant Examiner* — Farah Taufiq
(74) *Attorney, Agent, or Firm* — Cozen O'Connor (57) ABSTRACT

Crown of a tire for a heavy vehicle that is desensitized to attacks. The tire (1) comprises tread (2) having a median degree of surface siping $TL_C$, expressed in m/m², equal to the ratio between the cumulative length $L_{DC}$ of the cuts (21), present in a median portion of tread of axial width $W_C$, and the median area $A_C$ of the radially outer surface (23) of the tread (2), and protective reinforcement (4) comprising at least two protective layers (41, 42) that are formed of elastic metallic reinforcers and have a maximum breaking strength $R_{max}$, expressed in daN/m, such that the median degree of surface siping $TL_C$ of tread (2) is at least equal to 5 m/m² and a coupling ratio $C_C$, equal to the ratio between the maximum breaking strength $R_{max}$ and the median degree of surface siping $TL_C$, is at least equal to 18 000 daN.

19 Claims, 2 Drawing Sheets

(51) Int. Cl.
 B60C 11/12 (2006.01)
 B60C 11/03 (2006.01)

(52) U.S. Cl.
 CPC .. B60C 11/1272 (2013.01); *B60C 2009/2016* (2013.01); *B60C 2009/2019* (2013.01); *B60C 2009/2074* (2013.01); *B60C 2011/0353* (2013.01); *B60C 2011/0355* (2013.01); *B60C 2011/129* (2013.01); *B60C 2200/065* (2013.01)

(56) References Cited

U.S. PATENT DOCUMENTS

| | | | | |
|---|---|---|---|---|
| 2008/0289738 | A1* | 11/2008 | Nakamura | B60C 11/0311 152/209.24 |
| 2009/0065116 | A1* | 3/2009 | Harle | B60C 11/042 152/209.18 |
| 2009/0126847 | A1* | 5/2009 | Kobayashi | B60C 9/28 152/527 |
| 2010/0294413 | A1* | 11/2010 | Johnson | B29C 35/00 152/556 |
| 2013/0206293 | A1* | 8/2013 | Cercy | B60C 9/18 152/209.1 |
| 2013/0213542 | A1* | 8/2013 | Warfford | B60C 11/0327 152/209.18 |
| 2014/0008001 | A1* | 1/2014 | Becker | B60C 9/2006 152/527 |
| 2015/0136295 | A1* | 5/2015 | Barguet | D07B 7/022 152/527 |
| 2015/0251497 | A1* | 9/2015 | Ferlin | B60C 9/0007 152/535 |
| 2017/0080758 | A1 | 3/2017 | Spinnler | |
| 2017/0182846 | A1 | 6/2017 | Clement | |
| 2018/0056723 | A1 | 3/2018 | Domingo | |

FOREIGN PATENT DOCUMENTS

| | | | |
|---|---|---|---|
| FR | 3 018 734 | 9/2015 | |
| FR | 3 020 016 | 10/2015 | |
| FR | 3020016 A1 * | 10/2015 | ........... D07B 1/0613 |
| JP | 2012179948 A * | 9/2012 | |
| WO | WO 2005/014925 | 2/2005 | |
| WO | WO 2007/090603 | 8/2007 | |

* cited by examiner

TIRE CROWN FOR A HEAVY DUTY CIVIL ENGINEERING VEHICLE

RELATED APPLICATIONS

This is a U.S. National Phase Application under 35 USC 371 of International Application PCT/FR2017/053145 filed on Nov. 17, 2017.

This application claims the priority of French application no. 1661293 filed Nov. 21, 2016, the entire content of which is hereby incorporated by reference.

FIELD OF THE INVENTION

The present invention relates to a radial tire intended to be fitted to a heavy vehicle of construction plant type, and more particularly to the crown of such a tire.

BACKGROUND OF THE INVENTION

A radial tire for a heavy vehicle of construction plant type is intended to be fitted on a rim, the nominal diameter of which, within the meaning of the ETRTO (European Tire and Rim Technical Organisation) standard, is at least equal to 25 inches. Although not restricted to this type of application, the invention is described more particularly with reference to a radial tire of large size intended to be mounted, for example, on a dumper, a vehicle for transporting materials extracted from quarries or open cast mines.

A radial tire of large size is understood to be a tire intended to be mounted on a rim, the nominal diameter of which is at least equal to 49 inches and may be as much as 57 inches or even 63 inches.

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively.

In the following text, the expressions "radially inner/radially on the inside" and "radially outer/radially on the outside" mean "closer to" and "further away from the axis of rotation of the tire", respectively. "Axially inner/axially on the inside" and "axially outer/axially on the outside" mean "closer to" and "further away from the equatorial plane of the tire", respectively, the equatorial plane of the tire being the plane passing through the middle of the tread surface of the tire and perpendicular to the axis of rotation of the tire.

A radial tire comprises, radially from the outside to the inside, a tread, a crown reinforcement and a carcass reinforcement. The assembly made up of the tread and the crown reinforcement is the crown of the tire.

The tread is that part of the crown of the tire that is intended to come into contact with the ground via a tread surface and to be worn away. The tread comprises at least one elastomeric material and a more or less complex system of cuts separating elements in relief, referred to as tread pattern, for ensuring notably a satisfactory grip performance.

The cuts in the tread may have any type of orientation with respect to the circumferential direction of the tire. A distinction is usually made between the longitudinal or circumferential cuts that form an angle at most equal to 45° with the circumferential direction and the axial or transverse cuts that form an angle at least equal to 45° with the circumferential direction. Among the cuts, grooves and sipes are distinguished. A groove is a cut that defines a space delimited by facing walls of material that are spaced apart from one another such that said walls cannot come into contact with one another in the contact patch in which the tread is in contact with the ground, when the tire is running under recommended nominal load and pressure conditions. A sipe is a cut that defines a space delimited by walls of material that come into contact with one another during running.

The tread is generally characterized geometrically by an axial width $W_T$ and a radial thickness $H_T$. The axial width $W_T$ is defined as being the axial width of the contact surface of the tread of the new tire with smooth ground, the tire being subjected to pressure and load conditions as recommended, for example, by the E.T.R.T.O. (European Tire and Rim Technical Organization) standard. The radial thickness $H_T$ is defined, by convention, as being the maximum radial depth measured in the cuts. In the case of a tire for a heavy vehicle of construction plant type, and by way of example, the axial width $W_T$ is at least equal to 600 mm and the radial thickness $H_T$ is at least equal to 60 mm.

The tread is also frequently characterized by a volumetric void ratio TEV equal to the ratio between the total volume $V_D$ of the cuts, measured on the unconstrained tire, that is to say on the tire when it is not mounted and not inflated, and the sum of the total volume $V_D$ of the cuts and the total volume $V_R$ of the elements in relief delimited by these cuts. The sum $V_D + V_R$ corresponds to the volume contained radially between the tread surface and a bottom surface, translated from the tread surface radially inwards by a radial distance equal to the radial thickness $H_T$ of the tread. This volumetric void ratio TEV, expressed in %, governs in particular the wearing performance, in terms of the volume of wearable rubber available, and the longitudinal and transverse grip performance, through the presence of respectively transverse and longitudinal edge corners and of cuts capable of storing or removing water or mud.

In the present invention, cuts of which the radial depth $H_D$ is at least equal to 50% of the radial thickness $H_T$ and of which the width $W_D$ is at most equal to 20% of their radial depth $H_D$ are referred to as effective cuts. These are narrow cuts of the sipe type, i.e. cuts that define a space delimited by walls of material that come into contact with one another during running, this space being wide enough, however, to allow air to flow in said effective cuts.

These effective cuts, having a cumulative length $L_D$, measured on a radially outer surface of the tread, make it possible to define a degree of surface siping TL, expressed in $m/m^2$, equal to the ratio between the cumulative length $L_D$ of the effective cuts and the area A of the radially outer surface of the tread equal to $2\Pi R_E * W_T$, where $R_E$ is the external radius of the tire.

Radially on the inside of the tread, the crown reinforcement of a radial tire for a heavy vehicle of construction plant type comprises a superposition of circumferentially disposed crown layers radially on the inside of the tread and on the outside of the carcass reinforcement. Each crown layer is made up of generally metallic reinforcers that are mutually parallel and coated in an elastomeric material obtained by mixing that is commonly referred to as elastomeric compound.

Among the crown layers, a distinction is usually made between the protective layers, which constitute the protective reinforcement and are radially outermost, the working layers, which constitute the working reinforcement and are radially on the inside of the protective reinforcement, and the hooping layers, which are most often radially contained between the working reinforcement and the carcass reinforcement but may be radially contained between two working layers or radially contained between the protective reinforcement and the working reinforcement.

The protective reinforcement, which comprises at least two protective layers, essentially protects the working layers from mechanical or physicochemical attacks, likely to spread through the tread radially towards the inside of the tire. The protective reinforcement is often made up of two protective layers, which are radially superposed, formed of elastic metallic reinforcers, are mutually parallel in each layer and crossed from one layer to the next, forming angles with the circumferential direction that have an absolute value generally between 15° and 45°, and preferably between 20° and 40°.

The working reinforcement, which comprises at least two working layers, has the function of belting the tire and conferring stiffness and road holding on the tire. The working reinforcement absorbs both mechanical stresses of inflation, which are generated by the tire inflation pressure and transmitted by the carcass reinforcement, and mechanical stresses caused by running, which are generated as the tire runs over the ground and are transmitted by the tread. The working reinforcement is also intended to withstand oxidation and impacts and puncturing, by virtue of its intrinsic design and that of the protective reinforcement. The working reinforcement is usually made up of two working layers, which are radially superposed, formed of inextensible metallic reinforcers, are mutually parallel in each layer and crossed from one layer to the next, forming angles with the circumferential direction that have an absolute value generally between 15° and 45°, and preferably between 15° and 40°.

The hoop reinforcement, which comprises at least one hooping layer, limits the radial deformations of the crown on inflation and contributes towards stiffening the crown. The hoop reinforcement is often made up of two hooping layers, which are radially superposed, formed of inextensible or elastic metallic reinforcers, are mutually parallel in each layer and crossed from one layer to the next, forming angles with the circumferential direction that have an absolute value at most equal to 15°, preferably at most equal to 8°.

A metallic reinforcer is characterized mechanically by a curve representing the tensile force (in N) applied to the metallic reinforcer as a function of the relative elongation (in %) of the metallic reinforcer, referred to as the force-elongation curve. Mechanical tensile characteristics, such as the structural elongation As (in %), the total elongation at break At (in %), the force at break Fm (maximum load in N) and the breaking strength Rm (in MPa) are derived from this force-elongation curve, these characteristics being measured in accordance with the standard ISO 6892 of 1984.

The total elongation at break At of the metallic reinforcer is, by definition, the sum of the structural, elastic and plastic elongations thereof (At=As+Ae+Ap). The structural elongation As results from the relative positioning of the metal threads making up the metallic reinforcer under a low tensile force. The elastic elongation Ae results from the actual elasticity of the metal of the metal threads making up the metallic reinforcer, taken individually and satisfying Hooke's law. The plastic elongation Ap results from the plasticity, i.e. the irreversible deformation beyond the yield point, of the metal of the metal threads taken individually. These different elongations and the respective meanings thereof, which are well known to a person skilled in the art, are described for example in the documents U.S. Pat. No. 5,843,583, WO2005/014925 and WO2007/090603.

Also defined, at any point on the force-elongation curve, is a tensile modulus (in GPa) which represents the gradient of the straight line tangential to the force-elongation curve at this point. In particular, the tensile modulus of the elastic linear part of the force-elongation curve is referred to as the elastic tensile modulus or Young's modulus.

Among the metallic reinforcers, a distinction is usually made between the elastic metallic reinforcers, such as the ones most often used in the protective layers, and the inextensible metallic reinforcers, such as the ones generally used in the working layers.

An elastic metallic reinforcer is characterized by a structural elongation As at least equal to 1% and a total elongation at break At least equal to 4%. Moreover, an elastic metallic reinforcer has an elastic tensile modulus at most equal to 150 GPa, and usually between 40 GPa and 150 GPa, preferably between 70 GPa and 110 GPa. The force at break Fm thereof is generally at least equal to 500 daN.

An example of an elastic metallic reinforcer is an elastic multistrand rope, that is to say one formed of an assembly of several strands. One particular but usual case of a multistrand elastic rope is made up of a layer of strands having two identical layers and a structure of the type K*(M+P), K being the number of strands having two layers, M being the number of metal threads making up the internal layer of a strand and P being the number of metal threads making up the external layer of a strand. A two-layer strand is usually obtained by helically winding P threads making up an external layer of the strand around M threads making up an internal layer of the strand.

For an elastic multistrand rope, the structural elongation As results from the construction and the aeration of the elastic multistrand rope, from the construction and the aeration of the elementary strands and also their intrinsic elasticity, and, where appropriate from a preformation imposed on one or more of these strands and/or constituent threads of the strands. The aeration of the rope results, for the one part, from the aeration of each strand depending on the spacing of the threads of the strand with respect to the direction perpendicular to the direction of the axis of the strand, and, for the other part, from the spacing of the strands with respect to the direction perpendicular to the direction of the axis of the rope.

An inextensible metallic reinforcer is characterized by a total elongation, under a tensile force equal to 10% of the force at break Fm, at most equal to 0.2%. Moreover, an inextensible metallic reinforcer has an elastic tensile modulus usually between 150 GPa and 200 GPa.

As regards the use of a tire for a heavy vehicle of construction plant type, said tire is intended to bear high loads and to run on tracks covered with stones of various sizes.

Running under high load will generate, in particular in the crown of the tire, high temperatures that are likely to cause deterioration of the components of the crown and to limit the endurance thereof, and consequently the service life of the tire. High temperatures are in particular generated in the working reinforcement, the working layers of which can separate under the action of the heat: this is referred to as thermal cleavage. Reducing the heat level in the crown of the tire in order to combat thermal cleavage is a constant preoccupation of tire designers.

Furthermore, running on tracks covered with stones, which will indent the tread, will bring about attacks on the crown of the tire by these indenting bodies. More specifically, the indenting bodies will not only attack the tread but may also get trapped in the cuts in the tread. The trapping of the stones in the cuts in the tread, usually referred to as stone retention, is likely to initiate cracks at the bottom of cuts, which will propagate radially towards the inside of the crown of the tire, reaching the crown reinforcement, and more specifically the protective reinforcement, which will deteriorate over time and break: this will reduce the service life of the tire. This phenomenon is all the more marked the greater the number and/or the greater the volume of the cuts in the tread, i.e. the higher the volumetric void ratio of the tread, which is typically at least equal to 12%. This problem of attacks on the crown is therefore likewise a preoccupation of tire designers.

In order to reduce the heat level of the crown of the tire, one known solution is to cut into the tread to a sufficient level, that is to say have a high volumetric void ratio, in order to lower the temperatures generated in the crown to an acceptable level. The higher the volumetric void ratio, the more the heat level of the crown will be reduced, but the more the crown risks being attacked by the indenting bodies present on tracks.

SUMMARY OF THE INVENTION

One object of the present invention is desensitizing the crown of a radial tire for a heavy vehicle of construction plant type to attacks by indenting bodies, in particular in the case of a tread with a high volumetric void ratio.

This objective has been achieved, according to one aspect of the invention, by a tire for a heavy vehicle of construction plant type, comprising a tread and a crown reinforcement radially on the inside of the tread:

the tread, having a radial thickness $H_T$ at least equal to 60 mm, comprising cuts having a radial depth $H_D$ and a width $W_D$, and elements in relief separated by the cuts, at least some of the cuts, referred to as effective cuts, having a radial depth $H_D$ at least equal to 50% of the radial thickness $H_T$ and a width $W_D$ at most equal to 20% of the radial depth $H_D$, the crown reinforcement comprising a protective reinforcement, a working reinforcement and a hoop reinforcement, the protective reinforcement, which is radially outermost, comprising two protective layers, in contact with one another over a medial axial width $W_C$, comprising elastic metallic reinforcers, that form an angle of between 15° and 45° with the circumferential direction, each protective layer having a breaking strength R per unit of layer width, expressed in daN/m, $R_{max}$ being the maximum value of the breaking strengths R of the protective layers, the working reinforcement comprising at least two working layers, comprising inextensible metallic reinforcers that are crossed from one working layer to the next and form an angle of between 15° and 45° with a circumferential direction of the tire, the hoop reinforcement comprising at least one hooping layer, comprising metallic reinforcers that form an angle at most equal to 15° with the circumferential direction, the median degree of surface siping $TL_C$ of the tread, defined as the ratio between the cumulative length $L_{DC}$ of the effective cuts, present on a median portion of tread having an axial width equal to $W_C$, and a median area $A_C$ of the radially outer surface of the tread equal to $2\Pi R_E * W_C$, where $R_E$ is the external radius of the tire, being at least equal to 5 m/m2, and the coupling ratio $C_C$, defined as the ratio between the maximum value $R_{max}$ of the breaking strengths R of the protective layers and the median degree of surface siping $TL_C$ of the tread, being at least equal to 18 000 daN.

A minimum median degree of surface siping $TL_C$ of the tread, i.e. a minimum cumulative length $L_{DC}$ of the effective cuts, present on a median portion of tread having an axial width equal to $W_C$, per unit of surface area, ensures minimum ventilation of the effective cuts of the median portion of the tread, and therefore cooling of the tread and, consequently, a reduction in the internal temperatures of the crown, which are high in the median portion on account of the high contact pressures with the ground in this zone. It should be noted that a decrease in the heat level therefore makes it possible to increase the productivity of material transport by vehicles equipped with such tires.

The median portion of tread is conventionally defined as being the tread portion which is symmetric to the equatorial plane of the tire and in line with the portion of the protective reinforcement, also referred to as the coupling portion of the protective reinforcement, in which the two protective layers are in contact with one another over an axial width equal to $W_C$. It should be noted that, usually, in the field of tires of heavy vehicles of construction plant type, the axial width $W_C$ is substantially equal to 0.6 times the total axial width $W_T$ of the tread, and substantially equal to 0.9 times the axial width of the narrowest protective layer, which is generally radially outermost in the protective reinforcement.

This median degree of surface siping $TL_C$ is determined on the tire in the new state. However, after the tread has worn down by 50%, i.e. when the radial thickness of the tread is equal to $H_T/2$, the median degree of surface siping $TL_C$, determined on the half-worn tire, remains substantially equal to the median degree of surface siping $TL_C$ determined on the tire in the new state. This ensures the durability of the grip performance of the tire during the course of its life.

A minimum coupling ratio $C_C$, defined as the ratio between the maximum value $R_{max}$ of the breaking strengths R of the protective layers and the median degree of surface siping $TL_C$ of the tread, is necessary for the mechanical strength of the protective reinforcement, for a given median degree of surface siping $TL_C$. In other words, given the presence of cuts in the median portion of the tread, which is particularly sensitive to attacks on account of the high contact pressures with the ground in this zone, the protective reinforcement should have sufficient breaking strength.

Consequently, the combination of these two essential features makes it possible to obtain a satisfactory compromise between the heat level of the crown and the resistance to attacks on the crown that are likely to initiate cracking from the tread radially towards the inside of the crown of the tire, in particular in the median portion of tread, which is a zone of high contact pressures with the ground.

Preferably, the coupling ratio $C_C$ is at least equal to 24 000 daN. A higher coupling ratio $C_C$ reinforces the resistance to attacks on the crown, and thus allows use on ground that is even rougher with the same level of cooling of the crown.

More preferably, the coupling ratio $C_C$ is at most equal to 72 000 daN. Above this coupling ratio, the maximum value $R_{max}$ of the breaking strengths R of the protective layers requires, at the protective reinforcement, a level of reinforcement that can be obtained with large-diameter metallic reinforcers, involving very thick protective layers that are likely to worsen the heat level of the crown.

Advantageously, the median degree of surface siping $TL_C$ of the tread is at least equal to 5.8 m/m². The ventilation of the effective cuts in the tread is improved by a higher median degree of surface siping $TL_C$.

Further advantageously, the median degree of surface siping $TL_C$ of the tread is at most equal to 15 m/m². Above this value, the cumulative length $L_{DC}$ of effective cuts, present on a median portion of tread having an axial width equal to $W_C$, per unit of surface area, and consequently the number of effective cuts per unit of surface area of the median portion of tread, risks sensitizing the tread to attack to an unacceptable degree. For the one part, the number of regions of initiation of cracks at the bottom of cuts becomes high. For the other part, on account of the large number of cuts, the dimensions of the elements in relief decrease and thus the stiffnesses of said elements in relief decrease, thereby increasing the risk of the elements in relief tearing.

Advantageously, the circumferential median degree of surface siping $TL_{CX}$ of the tread, defined as the ratio between the sum of the projections, in the circumferential direction, of the lengths of the effective cuts, present on a median portion of tread having an axial width equal to $W_C$, and a median area $A_C$ of the radially outer surface of the tread equal to $2\Pi R_E * W_C$, where $R_E$ is the external radius of the tire, is at least equal to 2.5 m/m². This feature ensures, in particular, satisfactory transverse grip on slightly muddy ground, this being particularly useful for running on winding tracks.

Further advantageously, the axial median degree of surface siping $TL_{CX}$ of the tread, defined as the ratio between the sum of the projections, in the axial direction, of the lengths of the effective cuts, present on a median portion of tread having an axial width equal to $W_C$, and a median area $A_C$ of the radially outer surface of the tread equal to $2\Pi R_E * W_C$, where $R_E$ is the external radius of the tire, is at least equal to 3.5 m/m2. This feature ensures, in particular, satisfactory longitudinal grip on slightly muddy ground, this being particularly useful for running upward on sloping ground.

The combination of a circumferential median degree of surface siping $TL_{CX}$ and an axial median degree of surface siping $TL_{CY}$ of the tread that are sufficiently high also allows a more uniform distribution of the cuts, thereby improving the ventilation of the tread.

On the median portion of tread having an axial width $W_C$, the median volumetric void ratio $TEV_C$, expressed in %, which is equal to the ratio between the total volume $V_{DC}$ of the cuts in the median portion and the sum of the total volume $V_{DC}$ of the cuts in the median portion and the total volume $V_{RC}$ of the elements in relief of the median portion, is advantageously at most equal to the overall volumetric void ratio TEV, preferably at most equal to 0.7 times the overall volumetric void ratio TEV. The overall volumetric void ratio TEV is defined across the entire axial width $W_T$ of the tread and is equal to the ratio between the total volume $V_D$ of the cuts and the sum of the total volume $V_D$ of the cuts and the total volume $V_R$ of the elements in relief. A limited median volumetric void ratio $TEV_C$ results generally in a limited thickness of the cuts in the median portion, said cuts of limited thickness making it possible to have sufficient ventilation of the tread without sensitizing the tread to attack.

The overall volumetric void ratio TEV is advantageously at least equal to 12%, preferably at least equal to 14%. This ensures a sufficient volume of cuts, making it possible to ensure effective thermal ventilation of the tread, and thus cooling of the crown of the tire. Such an overall volumetric void ratio TEV ensures good grip on very muddy ground.

Across the total axial width $W_T$ of the tread, the overall degree of surface siping TL of the tread, defined as the ratio between the cumulative length $L_D$ of the effective cuts, present across the entire axial width $W_T$ of the tread, and the area of the radially outer surface of the tread equal to $2\Pi R_E * W_T$, where $R_E$ is the external radius of the tire, is advantageously at least equal to 3 m/m².

The maximum value $R_{max}$ of the breaking strengths R of the protective layers is advantageously at least equal to 150 000 daN/m, preferably at least equal to 160 000 daN/m. This makes it possible to ensure satisfactory resistance to cutting of the protective layers in question.

According to a first advantageous embodiment of the protective reinforcement, the breaking strength R of the radially outermost protective layer is equal to the maximum value $R_{max}$ of the breaking strengths R of the protective layers. The radially outermost protective layer is the first barrier to the penetration of the indenting bodies. This makes it possible to optimize the resistance to cutting of the protective reinforcement.

According to a second preferred embodiment of the protective reinforcement, the breaking strength R of each protective layer is equal to the maximum value $R_{max}$ of the breaking strengths R of the protective layers. This makes it possible to maximize the resistance to cutting of the protective reinforcement.

According to a third advantageous embodiment of the protective reinforcement, the minimum value $R_{min}$ of the breaking strengths R of the protective layers is such that the ratio $R_{min}/TL_C$ is at least equal to 18 000 daN. In other words, all the protective layers have a breaking strength R such that the ratio $R_{min}/TL_C$ is at least equal to 18 000 daN. This makes it possible to obtain a satisfactory compromise between the heat level of the crown and the resistance to cutting of the protective reinforcement.

According to one preferred embodiment of the metallic reinforcers of the protective layers, the elastic metallic reinforcers of the protective layers are multistrand ropes, made up of a single layer of K strands, K being between 3 and 5, each strand being made up of metal threads. This type of metallic reinforcer is characterized by good penetrability by an elastomeric coating compound, thereby ensuring good corrosion resistance and thus an improvement in the endurance of the protective reinforcement.

According to a first variant of the preferred embodiment of the metallic reinforcers of the protective layers, each strand, of structure (M+P), comprises an internal layer of M metal threads and an external layer of P metal threads wound around the internal layer. Each strand is thus made up of two concentric layers of metal threads.

According to one particular example of the first variant of the preferred embodiment of the metallic reinforcers of the protective layers, the elastic metallic reinforcers of the protective layers are multistrand ropes, of structure 4*(3+8)*0.35, made up of a single layer of 4 strands, each strand comprising an internal layer of 3 metal threads and an external layer of 8 metal threads wound around the internal layer, and each strand being made up of metal threads with a diameter equal to 0.35 mm.

According to another particular example of the first variant of the preferred embodiment of the metallic reinforcers of the protective layers, the elastic metallic reinforcers of the protective layers are multistrand ropes, of structure 4*(4+9)*0.26, made up of a single layer of 4 strands, each strand comprising an internal layer of 4 metal threads and an external layer of 9 metal threads wound around the internal layer, and each strand being made up of metal threads with a diameter equal to 0.26 mm.

According to a second variant of the preferred embodiment of the metallic reinforcers of the protective layers, each strand, of structure (M+N+P), comprises an intermediate layer of N metal threads wound around the internal layer of M metal threads, the external layer of P metal threads being wound around the intermediate layer of N metal threads. Each strand is thus made up of three concentric layers of metal threads.

Preferably, the external layer of P metal threads is unsaturated. By definition, an unsaturated layer of threads is such that there is sufficient room in this layer to add at least one (P+1)th thread having the same diameter as the P threads of the layer thereto, it thus being possible for a plurality of threads to be in contact with one another.

Also preferably, the diameter of the constituent threads of each strand is at least equal to 0.22 mm, preferably at least equal to 0.26 mm.

The elastic metallic reinforcers of the protective layers have, in the air permeability test, a mean air flow rate of less than 30 cm$^3$/min. This criterion characterizes the penetration of the metallic reinforcers of the metal cord type by the elastomeric coating compound. The lower this mean air flow rate, the more the metal cords are penetrated, thereby improving their endurance, given a low circulation of air, and thus oxygen, which is a corrosion factor, inside the reinforcers.

As regards the air permeability test, this test makes it possible to determine the longitudinal permeability to air of the metal cords tested, by measuring the volume of air passing along a test specimen under constant pressure over a given period of time.

The principle of such a test, which is well known to a person skilled in the art, is to demonstrate the effectiveness of the treatment of a metal cord to make it impermeable to air; it has been described for example in standard ASTM D2692-98.

The test is carried out either on metal cords that have been withdrawn from tires, and are thus already coated on the outside with an elastomeric compound or composition of rubber in the cured state, or on metal cords as manufactured.

In the second case, the as-manufactured metal cords need to be coated from the outside beforehand with a rubber composition referred to as coating rubber. For this purpose, a series of 10 cords laid parallel (distance between cords: 20 mm) is placed between two skims (two rectangles measuring 80×200 mm) of a rubber composition in the raw state, each skim having a thickness of 3.5 mm; all of this is then immobilized in a mould, with each of the metal cords being kept under sufficient tension (for example 2 daN) to ensure that it lies straight as it is being placed in the mould, using clamping modules; it is then vulcanized (cured) for 40 min at a temperature of 140° C. and at a pressure of 15 bar (rectangular piston measuring 80×200 mm). After that, the entirety is removed from the mould and ten test specimens of metal cords thus coated are cut out, for characterizing, in the shape of parallelepipeds measuring 7×7×20 mm.

The compound used as a coating rubber is a rubber compound conventionally used in tires, based on natural (peptized) rubber and carbon black N330 (65 phr), also containing the following usual additives: sulfur (7 phr), sulfenamide accelerator (1 phr), ZnO (8 phr), stearic acid (0.7 phr), antioxidant (1.5 phr), cobalt naphthenate (1.5 phr) (phr meaning parts by weight per hundred parts of elastomer); the E10 tensile modulus at 10% elongation of the coating rubber is around 10 MPa.

The test is carried out on a 2 cm length of metal cord, which is therefore coated with its surrounding rubber compound (or coating rubber) in the cured state, in the following way: air is injected into the inlet end of the cord at a pressure of 1 bar and the volume of air at the outlet end is measured using a flow meter (calibrated for example from 0 to 500 cm3/min). During the measurement, the sample of metal cord is immobilized in a compressed airtight seal (for example, a seal made of dense foam or of rubber) so that only the amount of air passing along the metal cord from one end to the other, along its longitudinal axis, is taken into account by the measurement; the airtightness of the airtight seal itself is checked beforehand using a solid rubber test specimen, that is to say one devoid of cord.

The lower the mean air flow rate measured (averaged over the ten test specimens), the higher the longitudinal impermeability of the metal cord. As the measurement is taken with a precision of ±0.2 cm3/min, measured values of less than or equal to 0.2 cm3/min are considered to be zero; they correspond to a metal cord that can be described as airtight (completely airtight) along its axis (i.e. in its longitudinal direction).

According to one advantageous embodiment of the protective layers, the elastic metallic reinforcers of the protective layers are distributed at a mean spacing of between 3.5 mm and 6 mm.

BRIEF DESCRIPTION OF THE DRAWINGS

The features of the invention will be better understood with the aid of FIGS. 1 and 2, which are schematic and not to scale.

DETAILED DESCRIPTION OF THE DRAWINGS

Figure 1:
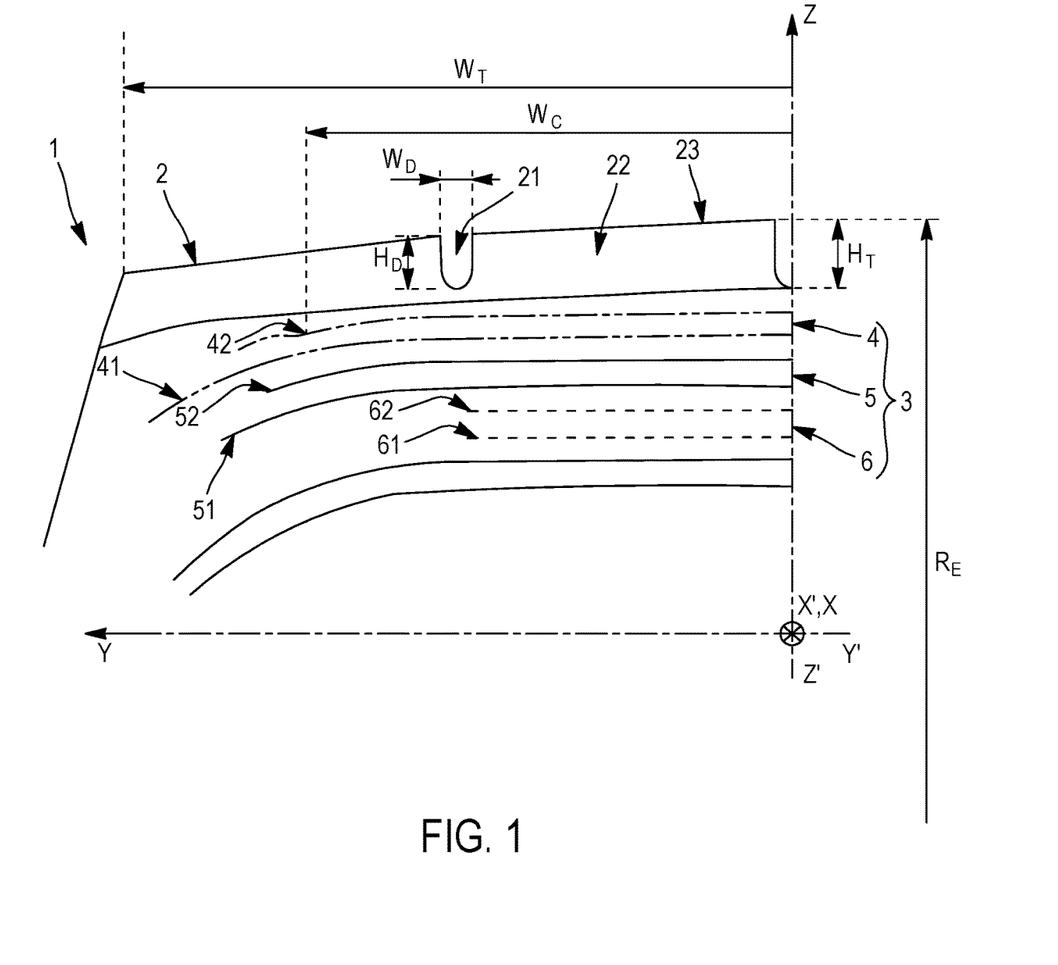
FIG. 1 is a half-section, on a meridian plane, of a crown of a tire for a heavy vehicle of construction plant type, according to the invention.

FIG. 1 shows a meridian half-section, in a plane YZ, of the crown of a tire 1 for a heavy vehicle of construction plant type, comprising a tread 2 and a crown reinforcement 3 radially on the inside of the tread 2. The tread 2, having a radial thickness $H_T$ at least equal to 60 mm, comprises cuts 21 having a width $W_D$ and a radial depth $H_D$, and elements in relief 22 separated by the cuts 21. The tread 2 comprises a median portion, positioned in line with a portion of the protective reinforcement 4, having an axial width $W_C$ across which the two protective layers (41, 42) are in contact with one another. The cuts 21, the width $W_D$ of which is at most equal to 20% of the radial depth $H_D$ and the radial depth $H_D$ of which is at least equal to 50% of the radial thickness $H_T$, referred to as effective cuts, present on the median portion of tread 2 of width $W_C$, have a cumulative length $L_D$ (not shown in the figure) measured on a radially outer surface 23 of the tread 2. This cumulative length $L_{DC}$ makes it possible to define a median degree of surface siping $TL_C$, expressed in m/m$^2$, equal to the ratio between the cumulative length $L_{DC}$ and the median area $A_C$ of the radially outer surface 23 of the tread equal to $2\Pi R_E * W_C$, where $R_E$ is the external radius of the tire, measured in the equatorial plane XZ, between the axis of revolution YY' and the radially outer surface 23 of the tread 2 or tread surface. Radially on the inside of the tread 2, the crown reinforcement 3 comprises a protective reinforcement 4, a working reinforcement 5 and a hoop reinforcement 6. The protective reinforcement 4, which is radially outermost, comprises two protective layers (41, 42), formed of elastic metallic reinforcers, that form an angle of between 15° and 45° with the circumferential direction XX'. Each protective layer (41, 42) has a breaking strength R per unit of layer width, expressed in daN/m, $R_{max}$ being the maximum value of the breaking strengths R of the protective layers (41, 42). The working reinforcement 5 comprises two working layers (51, 52), formed of inextensible metallic reinforcers that are crossed from one working layer to the next and form an angle of between 15° and 45° with the circumferential direction XX'. The hoop reinforcement 6 comprises two hooping layers (61, 62), formed of metallic reinforcers that form an angle at most equal to 15° with the circumferential direction XX'.

Figure 2:
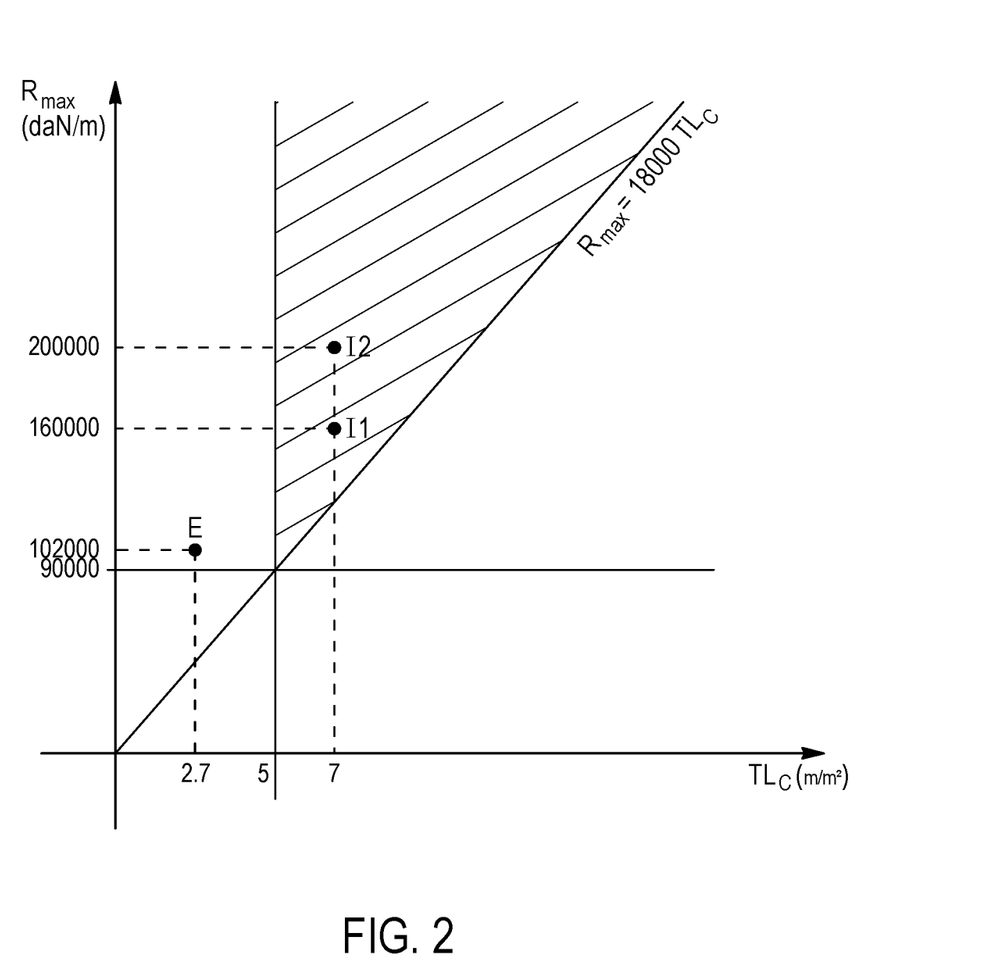
FIG. 2 shows the range of the maximum breaking strengths $R_{max}$ as a function of the median degree of surface siping $TL_C$ of the tread for a tire for a heavy vehicle of construction plant type, according to the invention.

FIG. 2 shows the range of the maximum breaking strengths $R_{max}$ as a function of the median degree of surface siping $TL_C$ of the tread of a tire for a heavy vehicle of construction plant type according to the invention. According to the invention, the median degree of surface siping $TL_C$ of the tread is at least equal to 5 m/m², and a coupling ratio $C_C$, equal to the ratio between the maximum value $R_{max}$ of the breaking strengths R of the protective layers and the median degree of surface siping $TL_C$ of the tread 2, is at least equal to 18 000 daN. Consequently, the range of the invention is defined by the maximum breaking strengths $R_{max}$, at least equal to 18 000*$TL_C$, where $TL_C$ is at least equal to 5 m/m². Shown on the abscissa axis of the graph in FIG. 2 is the minimum value of the median degree of surface siping $TL_C$ of the tread equal to 5 m/m². Shown on the ordinate axis of the graph in FIG. 2 is the minimum value of the maximum strength $R_{max}$ of the breaking strengths R of the protective layers equal to 90 000 daN/m, corresponding to the minimum coupling rate $C_C$ equal to 18 000 daN. Also shown in the graph are a first exemplary embodiment of the invention I1, in which the median degree of surface siping $TL_C$ is equal to 7 m/m² and the maximum value $R_{max}$ of the breaking strengths R of the protective layers is equal to 160 000 daN/m, the protective layers comprising elastic multistrand ropes of structure 4*(4+9)*0.26, and a second exemplary embodiment of the invention I2, in which the median degree of surface siping $TL_C$ is also equal to 7 m/m² and the maximum value $R_{max}$ of the breaking strengths R of the protective layers is equal to 200 000 daN/m, the protective layers comprising elastic multistrand ropes of structure 4*(3+8)*0.35. Also shown in FIG. 2 is an example of the prior art E that is characterized by a median degree of surface siping $TL_C$ equal to 2.7 m/m² and a maximum value $R_{max}$ of the breaking strengths R of the protective layers equal to 102 000 daN/m, i.e. outside the range of the invention.

The invention has been studied more particularly in the case of a tire of size 40.00R57. Two examples of tires according to the invention I1 and I2 and a tire of the prior art E, taken as a reference, were compared by the inventors.

In the case studied, the tires of the prior art E and according to the invention I1 and I2, respectively, have a crown reinforcement comprising, radially from the outside to the inside, a protective reinforcement made up of two protective layers with elastic metallic reinforcers, a working reinforcement made up of two working layers with inextensible metallic reinforcers, and a hoop reinforcement made up of two hooping layers with inextensible metallic reinforcers. As regards the protective reinforcement, the elastic metallic reinforcers of the two protective layers, which are crossed from one layer to the next, form, with the circumferential direction XX', an angle equal to 24° for the tire of the prior art E, and an angle equal to 33° for the tires according to the invention I1 and I2. As regards the working reinforcement, the inextensible metallic reinforcers of the two working layers, which are crossed from one layer to the next, form, with the circumferential direction XX', angles equal to 33° and 19°, respectively, for the tire of the prior art E, and angles equal to 33° and 24°, respectively, for the tires according to the invention I1 and I2. As regards the hoop reinforcement, the inextensible metallic reinforcers of the two hooping layers, which are crossed from one layer to the next, form, with the circumferential direction XX', an angle of between 6° and 8° for the tire of the prior art E and for the tires according to the invention I1 and I2.

In the case studied, the tires of the prior art E and according to the invention I1 and I2, respectively, have treads that comprise at least three circumferential cuts or furrows, the cuts having a width $W_D$ at least equal to 8 mm. The corresponding treads have an overall volumetric void ratio TEV at least equal to 12%.

For the example studied of 40.00R57, the characteristics of the crown for the tire of the prior art E taken as a reference and for the tires according to the invention I1 and I2 are presented in Table 1 below:

TABLE 1

| Tire size | E (40.00R57) | I1 (40.00R57) | I2 (40.00R57) |
| --- | --- | --- | --- |
| Axial width $W_T$ of the tread (m) | 0.98 m | 0.98 m | 0.98 m |
| Median axial width $W_C$ (=0.6 $W_T$) of the tread (m) | 0.59 m | 0.59 m | 0.59 m |
| Radial thickness $H_T$ of the tread (m) | 0.098 m | 0.098 m | 0.098 m |
| External radius $R_E$ of the tire (m) | 1.79 m | 1.79 m | 1.79 m |
| Area of the tread surface A = 2ΠR$_E$ * $W_T$ (m²) | 11 m² | 11 m² | 11 m² |
| Median area of the tread surface $A_C$ = 2ΠR$_E$ * $W_C$ (m²) | 6.6 m² | 6.6 m² | 6.6 m² |
| Cumulative length $L_D$ of the effective cuts, across the total axial width $W_T$ (m) | 17.3 m | 45.8 m | 45.8 m |
| Cumulative length $L_{DC}$ of the effective cuts, present in the median part of axial width $W_C$ (m) | 17.3 m | 45.8 m | 45.8 m |
| Cumulative length $L_{DCX}$ of the effective cuts, present in the median part, in the circumferential direction (XX') (m) | 11 m | 28 m | 28 m |

TABLE 1-continued

| Tire size | E (40.00R57) | I1 (40.00R57) | I2 (40.00R57) |
|---|---|---|---|
| Cumulative length $L_{DCY}$ of the effective cuts, present in the median part, in the axial direction (YY') (m) | 9.5 m | 33 m | 33 m |
| Overall degree of surface siping TL = $L_D/A$ (m/m²) | 1.6 m/m² | 4.2 m/m² | 4.2 m/m² |
| Overall volumetric void ratio TEV (%) | 18.1% | 14.2% | 14.2% |
| Median degree of surface siping $TL_C = L_{DC}/A_C$ | 2.7 m/m² | 7 m/m² | 7 m/m² |
| Circumferential median degree of surface siping $TL_{CX} = L_{DCX}/A_C$ | 1.7 m/m² | 4.2 m/m² | 4.2 m/m² |
| Axial median degree of surface siping $TL_{CY} = L_{DCY}/A_C$ | 1.4 m/m² | 5.0 m/m² | 5.0 m/m² |
| Median volumetric void ratio $TEV_C$ (%) | 16.9% | 12.0% | 12.0% |
| Type of metallic reinforcers of the protective layers | 4*(1 + 5)*0.26 | 4*(4 + 9)*0.26 | 4*(3 + 8)*0.35 |
| Spacing of the metallic reinforcers of the protective layers (mm) | 2.5 mm | 3.7 mm | 4.8 mm |
| Maximum value $R_{max}$ of the breaking strengths R of the protective layers (daN/m) | 102 000 daN/m | 160 000 daN/m | 200 000 daN/m |
| Coupling ratio $C_C = R_{max}/TL_C$ (daN) | 37 778 daN | 22 857 daN | 28 571 daN |

The tires of the prior art and according to the invention were subjected to measurements and tests, in particular to evaluate the heat level of the crown, when the tire is subjected to recommended pressure, loading and speed conditions, and to quantify the breaking strength of the crown, when the tire is subjected to attacks by indenting bodies.

As far as the heat level is concerned, the temperature of the crown is measured close to the axial ends of the crown reinforcement, which are generally the hot points of the crown, with the aid of a temperature sensor. The results of these thermal measurements, in terms of temperatures at the axial ends of the crown reinforcement, are presented in Table 2 below, in relative values with respect to the tire of the prior art taken as a reference.

In order to characterize the breaking strength of a tire crown reinforcement subjected to impacts, a person skilled in the art is familiar with carrying out tests that consist in causing a tire, inflated to a recommended pressure and subjected to a recommended load, to run over a cylindrical indenting body, referred to as a polar, with a diameter of between 1 inch, or 25.4 mm, and 2.2 inches, or 55.9 mm, depending on the size of the tire, and with a given height. The breaking strength is characterized by the critical height of the polar, i.e. the maximum height of the polar that results in complete breakage of the crown reinforcement, i.e. in the breakage of all the crown layers. The results of these attack tests, in terms of maximum heights of a cylindrical polar with a diameter equal to 2 inches, are presented in Table 2 below, with respect to the tire of the prior art taken as a reference as base 100.

Table 2 below presents the results of thermal performance and performance with regard to resistance to attacks for the studied tires of the prior art E and according to the invention I1 and I2:

TABLE 2

| Tire size | E (40.00R57) | I1 (40.00R57) | I2 (40.00R57) |
|---|---|---|---|
| Thermal performance (temperatures at the axial ends of the crown reinforcement) | reference | −10° C. | −9° C. |
| Performance with regard to resistance to attacks (maximum height of the cylindrical polar with a diameter of 2″) | 100 | 140 | 180 |

According to Table 2, the heat level of the tires according to the invention I1 and I2 is lower by 10° and 9°, respectively, compared with that of the tire of the prior art E. The performance with regard to resistance to attacks of the crown of the tires according to the invention I1 and I2 is increased by 40% and 80%, respectively, compared with that of the tire of the prior art E.

The scope of the protection of the invention is not limited to the examples given hereinabove. The invention is embodied each novel characteristic and each combination of characteristics, which includes every combination of any features which are stated in the claims, even if this feature or combination of features is not explicitly stated in the examples.

The invention claimed is:

1. A tire for a heavy vehicle of construction plant type, comprising:
 a tread; and
 the tread, having a radial thickness $H_T$ at least equal to 60 mm, comprising:
  cuts having a radial depth $H_D$ and a width $W_D$, and
  elements in relief separated by the cuts;
  at least some of the cuts, referred to as effective cuts, having a radial depth $H_D$ at least equal to 50% of the radial thickness $H_T$ and a width $W_D$ at most equal to 20% of the radial depth a crown reinforcement radially on the inside of the tread, the crown reinforcement comprising:
a protective reinforcement:
a working reinforcement; and
a hoop reinforcement;
the protective reinforcement, which is radially outermost, comprising:
two protective layers, in contact with one another over a median axial width $W_C$, wherein a radial spacing between the two protective layers, measured at a same axial position of each of two protective layers, is constant over the median axial width $W_C$ and increases beyond the median axial width $W_C$,
comprising elastic metallic reinforcers, that form an angle of between 15° and 45° with a circumferential direction,
each said protective layer having a breaking strength R per unit of layer width, expressed in daN/m, $R_{max}$ being the maximum value of the breaking strengths R of the protective layers;
the working reinforcement comprising at least two working layers, comprising inextensible metallic reinforcers that are crossed from one working layer to the next and form an angle of between 15° and 45° with the circumferential direction of the tire; and
the hoop reinforcement comprising at least one hooping layer, comprising metallic reinforcers that form an angle at most equal to 15° with the circumferential direction,
wherein the median degree of surface siping $TL_C$ of the tread, defined as the ratio between the cumulative length $L_{DC}$ of the effective cuts, present on a median portion of the tread having an axial width equal to $W_C$, and a median area $A_C$ of the radially outer surface of the tread equal to $2\Pi R_E * W_C$, where $R_E$ is the external radius of the tire, is at least equal to 5 m/m² and wherein the coupling ratio $C_C$, defined as the ratio between the maximum value $R_{max}$ of the breaking strengths R of the protective layers and the median degree of surface siping $TL_C$ of the tread, is at least equal to 18 000 daN.

2. The tire for a heavy vehicle of construction plant type according to claim 1, wherein the coupling ratio $C_C$ is at least equal to 24 000 daN.

3. The tire for a heavy vehicle of construction plant type according to claim 1, wherein the coupling ratio $C_C$ is at most equal to 72 000 daN.

4. The tire for a heavy vehicle of construction plant type according to claim 1, wherein the median degree of surface siping $TL_C$ is at least equal to 5.8 m/m².

5. The tire for a heavy vehicle of construction plant type according to claim 1, wherein the median degree of surface siping $TL_C$ is at most equal to 15 m/m².

6. The tire for a heavy vehicle of construction plant type according to claim 1, wherein the circumferential median degree of surface siping $TL_{CX}$ of the tread, defined as the ratio between the sum of the projections, in the circumferential direction, of the lengths of the effective cuts, present on a median portion of tread having an axial width equal to $W_C$, and a median area $A_C$ of the radially outer surface of the tread equal to $2\Pi R_E * W_C$, where $R_E$ is the external radius of the tire, is at least equal to 2.5 m/m².

7. The tire for a heavy vehicle of construction plant type according to claim 1, the tire having an axial direction parallel to its axis of rotation, wherein the axial median degree of surface siping $TL_{CY}$ of the tread, defined as the ratio between the sum of the projections, in the axial direction, of the lengths of the effective cuts, present on a median portion of tread having an axial width equal to $W_C$, and a median area $A_C$ of the radially outer surface of the tread equal to $2\Pi R_E * W_C$, where $R_E$ is the external radius of the tire, is at least equal to 3.5 m/m2.

8. The tire for a heavy vehicle of construction plant type according to claim 1, wherein the maximum value $R_{max}$ of the breaking strengths R of the protective layers is at least equal to 150 000 daN/m.

9. The tire for a heavy vehicle of construction plant type according to claim 1, wherein the breaking strength R of the radially outermost protective layer is equal to the maximum value $R_{max}$ of the breaking strengths R of the protective layers.

10. The tire for a heavy vehicle of construction plant type according to claim 1, wherein the breaking strength R of each protective layer is equal to the maximum value $R_{max}$ of the breaking strengths R of the protective layers.

11. The tire for a heavy vehicle of construction plant type according to claim 1, wherein the minimum value $R_{min}$ of the breaking strengths R of the protective layers is such that the ratio $R_{min}/TL_C$ is at least equal to 18 000 daN.

12. The tire for a heavy vehicle of construction plant type according to claim 1, wherein the elastic metallic reinforcers of the protective layers are multistrand ropes, made up of a single layer of K strands, K being between 3 and 5, each strand being made up of metal threads.

13. The tire for a heavy vehicle of construction plant type according to claim 1, wherein the working reinforcement extends beyond the median axial width $W_C$.

14. The tire for a heavy vehicle of construction plant type according to claim 1, wherein the hoop reinforcement extends less than the median axial width $W_C$.

15. The tire for a heavy vehicle of construction plant type according to claim 1, wherein an overall volumetric void ratio is a ratio between a total volume of the cuts in the median portion and a sum of the total volume of the cuts in the median portion and a total volume of the elements in relief of the median portion.

16. The tire for a heavy vehicle of construction plant type according to claim 15, wherein an overall volumetric void ratio is at least equal to 12%.

17. The tire for a heavy vehicle of construction plant type according to claim 1, wherein an axial end of the median axial width $W_C$ is beyond a respective axially outermost cut.

18. The tire for a heavy vehicle of construction plant type according to claim 1, wherein at least one of the two protective layers has a convex shape beyond the median axial width $W_C$ so that the two protective layers radially diverge from one another beyond the median axial width $W_C$, measured at a same axial position of each of two protective layers.

19. The tire for a heavy vehicle of construction plant type according to claim 1, wherein at least one of the two protective layers has a convex shape beyond the median axial width $W_C$ so that the two protective layers radially converge after a maximum radial spacing, measured at a same axial position of each of two protective layers.

* * * * *